United States Patent [19]

Jacobs et al.

[11] Patent Number: 4,535,252
[45] Date of Patent: Aug. 13, 1985

[54] WIND ELECTRIC GENERATION PLANT AND SYSTEM WITH IMPROVED ALTERNATOR FIELD EXCITATION

[75] Inventors: Marcellus L. Jacobs; Paul R. Jacobs, both of Fort Myers, Fla.

[73] Assignee: Jacobs Wind Electric Company, Minneapolis, Minn.

[21] Appl. No.: 489,951

[22] Filed: Apr. 29, 1983

[51] Int. Cl.³ .......................... H02P 9/04; F03D 9/00
[52] U.S. Cl. ...................................... 290/44; 290/4 R; 290/43; 290/54; 290/55; 416/132 B; 322/28; 322/35
[58] Field of Search .................. 290/1 R, 4 D, 5, 6, 290/43, 44, 54, 55; 415/2 R, 3, 4; 416/132 B, 121 A, 50 A, 197 A; 322/5–12, 19, 22, 23, 24, 25, 28, 29, 35

[56] References Cited

U.S. PATENT DOCUMENTS

| | | | |
|---|---|---|---|
| 4,059,771 | 11/1977 | Jacobs et al. | 322/35 X |
| 4,146,264 | 3/1979 | Korzeniewski | 322/35 X |
| 4,228,361 | 10/1980 | Jacobs et al. | 290/44 |
| 4,228,362 | 10/1980 | Jacobs et al. | 290/55 X |
| 4,331,881 | 5/1982 | Soderholm et al. | 322/35 X |
| 4,355,239 | 10/1982 | Williams et al. | 322/8 X |
| 4,449,053 | 5/1984 | Kutcher | 416/132 B X |

*Primary Examiner*—Vit W. Miska
*Assistant Examiner*—Paul Shik Luen Ip

*Attorney, Agent, or Firm*—Edward L. Schwarz; Joseph A. Genovese

[57] ABSTRACT

An improvement in a wind electric generation system of the type disclosed in Jacobs et al. U.S. Pat. Nos. 4,059,771, 4,228,361, and 4,228,362, with particular reference to U.S. Pat. No. 4,228,361. The improvement provides circuitry means for monitoring, controlling, regulating and indicating the complete operation of a wind electric generation plant for the advantageous purposes of: more accurately controlling, via the use of digital logic load detection and control circuitry, the selective switching and automatic diversion of the supply of alternator output energy to and from the loads of a wind electric system; supplying power to a fixed auxiliary load for a controlled programmable period of time; reducing the switching transients of load switching silicon controlled rectifier (SCR) devices; controlling and regulating, with digital logic circuit means, the excitation field current level of a wind-driven alternator during all operations of a wind electric system in which an advantageous and proficient manner as to prevent damage to various included components and structural parts thereof at times of varying favorable and/or adverse weather conditions and during times of load switching; and, supplying to a storage battery means of a wind electric plant a trickle-charge whenever it is fully charged and no alternator output is being supplied to any auxiliary loads in order to keep the individual battery cells of a storage battery means evenly charged.

7 Claims, 11 Drawing Figures

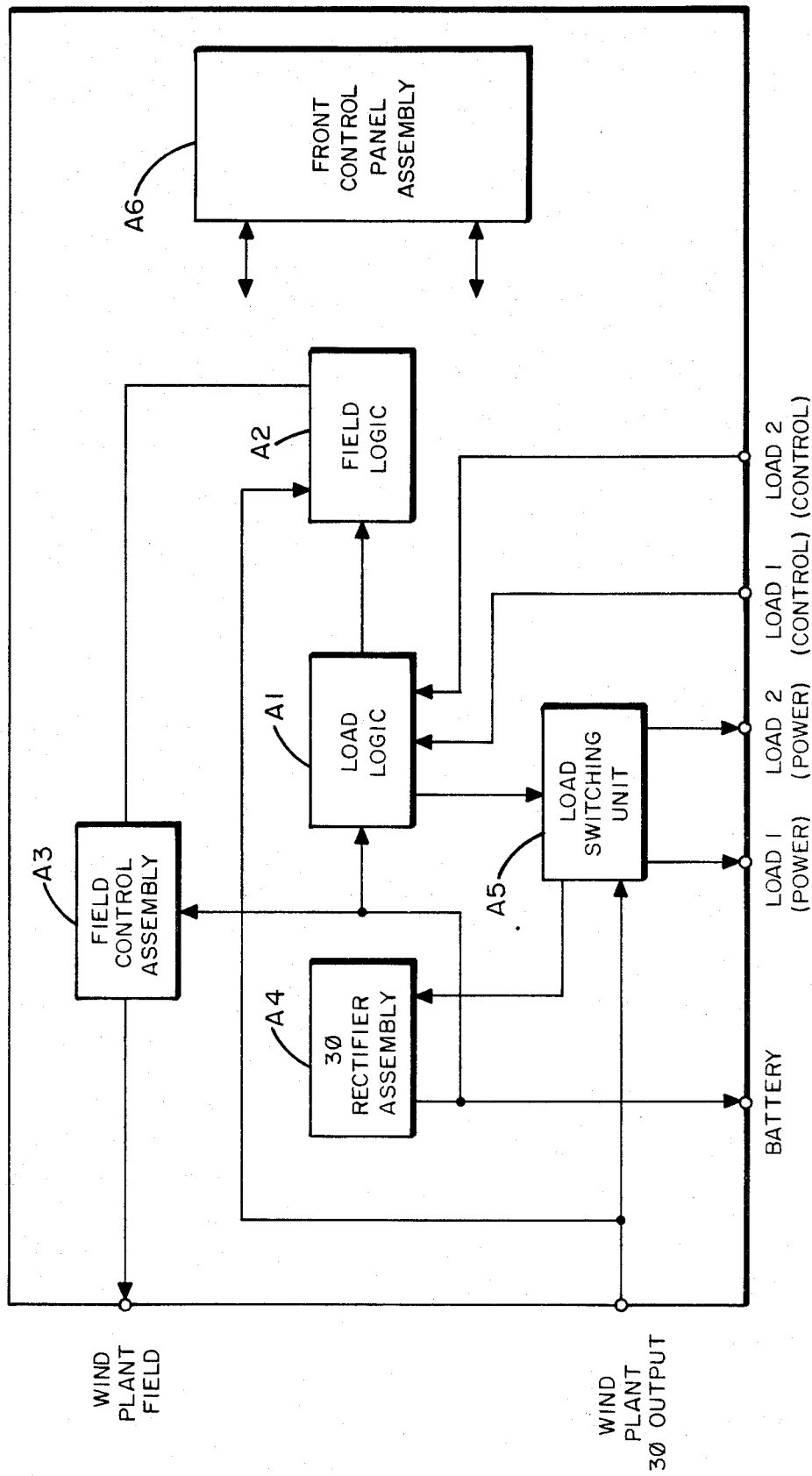

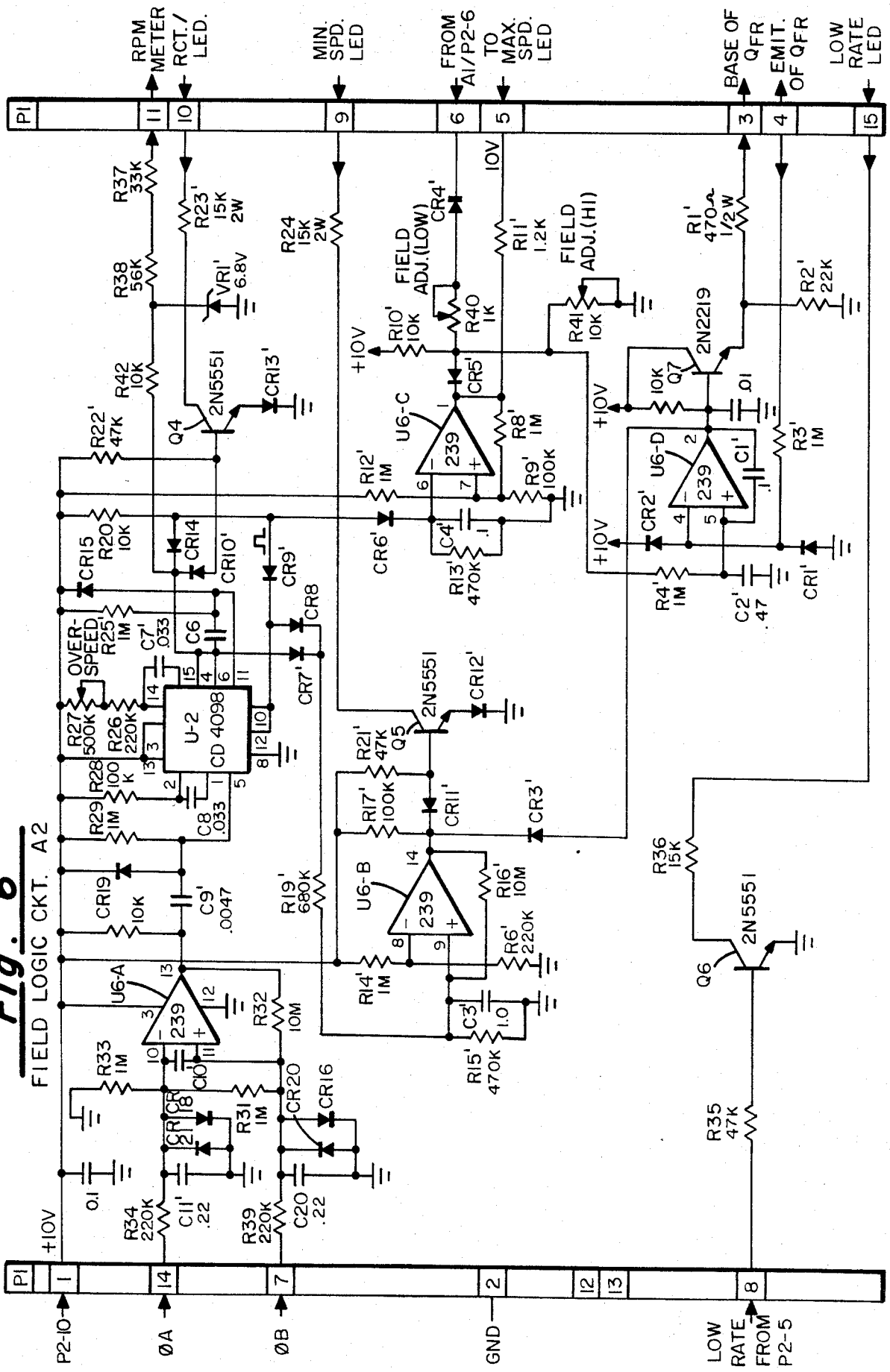
Fig. 6 FIELD LOGIC CKT. A2

Fig. 7a

OPERATIONAL TABLE A.

| FUNCTION | CONTROL STATE | MANUAL SWITCH | "DEMAND" SENSOR | SCR CONTROL | CONTROLS "ON" |
|---|---|---|---|---|---|
| BATTERY CHARGE | ON | SW1-3 | — | TR1 | Q1/TR1 |
| | OFF | SW1-1 | — | | |
| LOAD #1 | ON | SW2-3 | T1 CLOSED | TR2 | Q2/TR2 |
| | OFF | SW2-1 | T1 OPEN | | |
| LOAD #2 | ON | SW3-3 | T2 CLOSED | TR3 | Q3/TR3 |
| | OFF | SW3-1 | T2 OPEN | | |
| TRICKLE CHARGE | ON | N/A | T1/T2 OPEN AND BATTERY FULL | TR1 | Q1/TR1 |
| | OFF | | T1 OR T2 CLOSED OR BATTERY CHARGING | N/A | N/A |

Fig. 7b

| FIELD CURRENT REGULATION | "ON" | "OFF" | LIMIT ADJ. |
|---|---|---|---|
| LOW RATE OPERATION | OVERSPEED, LOAD SWITCHING, TRICKLE CHARGE | NORMAL OPERATION | R40 |
| HIGH RATE OPERATION | NORMAL OPERATION | LOW RATE OPERATION | R41 |
| OTHER | DURING WIND CONDITIONS = OR > MIN. WIND SPEED | BELOW MIN. WIND SPEED CONDITION | U6-B CONTROL CIRCUIT |

FIELD LOGIC CIRCUIT WAVEFORMS

OVERVOLTAGE CIRCUIT

WIND ELECTRIC GENERATION PLANT AND SYSTEM WITH IMPROVED ALTERNATOR FIELD EXCITATION

BACKGROUND OF THE INVENTION

The present invention relates, in general, to wind electric plants, and, more particularly, to a wind electric generation plant of the type which includes a wind driven propeller or the like to drive an alternator for producing electrical energy.

U.S. Pat. Nos. 4,059,771, 4,228,361, and 4,228,362, each issued to Jacobs et al, disclose prior wind electric plants or wind-operative systems of which the present invention is an improvement. Moreover, the present invention is an improvement in a wind energy system of the type disclosed in referenced Jacobs et al U.S. Pat. No. 4,228,361, the system output of which is used for purposes of either charging storage batteries or automatically and selectively supplying power to other electric loads when the battery storage capacity is reached in order to thereby maintain a constant load on the wind electric power plant to insure the quiet operation thereof.

The present inventors have found that the field of wind electric plants has need of means for: (1) controlling, in a more precise, proficient and efficient manner, the switching or automatic diversion of the supply of A.C. energy from the alternator output to and from the connected loads of a wind electric system; (2) supplying power to a fixed auxiliary load for a controlled, programmable period of time; (3) reducing the switching transients of load switching SCR devices; (4) controlling and regulating the level of excitation field current of a wind-driven alternator during a load switching operation in order to prevent torque shock, shock load or severe torque strain from being placed on the alternator mounts and entire stub tower structure of a wind electric plant in which the alternator is mounted; and (5) controlling. and preventing damage to a wind electric system upon the occurrence or during times of excessive alternator output due to an "overspeeding" condition caused by wind propeller speed surges created by high wind gusts or severe storm conditions. The presently disclosed system satisfies these needs and others of the field of wind electric plants.

SUMMARY AND OBJECTS OF THE INVENTION

With the present invention, the conventional expensive exciter generator may be eliminated and the field winding(s) of a wind-driven alternator is excited with different regulated levels of field current during the performance of various operations of a wind electric system, such operations being those performed during: a normal operating condition of a wind electric plant when a load is being supplied with A.C. or D.C. power at times of optimum wind conditions, a load switching function and, times of varying adverse wind conditions which cause slow (underspeed) or high (overspeed) wind propeller speeds which thereby result in undesirable wind alternator speeds of operation.

The improvement embodying the teachings of the present invention provides circuit means which provide or supply: a low rate (level) of field excitation current during an "overspeed" wind condition or a load switching operation, or a "trickle-charge" charging operation for a storage battery means which is automatically supplied thereto whenever it is fully charged and no energy is being supplied to any auxiliary loads and which trickle-charging operation is necessary in order to keep the individual battery cells of a storage battery means evenly charged; a high rate (level) of excitation field current being further provided by said circuit means during times of normal operation of a wind electric plant when full alternator output is needed to supply power to a load or loads connected thereto.

During a load switching, or load connecting, operation of the invention, the same being performed automatically on a load demand basis, and prior to the time at which the associated SCR devices of a load circuit to be supplied are activated, to therethrough supply power to an associated load from the alternator output, the excitation field current of the alternator is automatically reduced, in a sharp and instant manner, from a high (normal) rate level to a predetermined low rate level. Accordingly, such SCR devices are then enabled and activated to supply to its load, within a precise and brief period of time, a low level alternator power output, as produced by the low rate excitation field current in order to reduce the current being transferred by such SCR devices during a load switching process, thereby reducing the switching transients of such load switching SCR devices. Upon completion of this switching or load selection or load connection operation, the excitation field current control circuit means then "ramps", at a controlled and gradual rate of increase, the low rate excitation field current up to a predetermined high rate (normal) excitation field current level, which level of field current produces full alternator output power.

This controlled "ramping" method of the invention is important to an efficient and advantageous operation of a wind electric plant and the system dynamics and design criteria thereof with respect to the specific alternator of use therein, in that the same prevents a severe torque strain or torque load from being placed on the alternator mounts and the entire stub tower structure in which the alternator is mounted, when full alternator output power is diverted from one load to another. Due to the inherent support structures of steel towers of wind electric plants, when a suspended alternator is suddenly subjected to full torque load (it is already operating at full speed) it imports a severe torque (twisting action) on the tower creating a severe structural strain which is most undesirable. With the field current reduction and "ramping" process of the instant invention, such undesirable and dangerous conditions are, if not completely eliminated, substantially reduced.

Another need of the field of wind electric plants has been noted by the inventors, which is means for substantially eliminating the occurrence of a wind-driven alternator or generator from producing an excessive A.C. energy output that can damage equipment connected to the generator output. In this regard, wind energy systems are, at times, subjected to extreme power surges during high wind conditions and these power surges occur during overspeeding of the generator while speed governing action is taking place. Additionally, wind systems that transfer power horizontally or down a vertical shaft have a serious torque problem when subjected to "overspeed" conditions caused by high wind gusts. Only an immediate reduction in torque can prevent a serious torque strain from being placed on the entire power head. The propellers have considerable flywheel inertia (a 23 foot diameter wind propeller has over 5,000 pounds of centrifugal weight at full speed operation) which resists a rapid direction change or yaw motion created by the sudden torque increase caused by wind gusts. The present invention further satisfies these needs and thus provides an additional advantage over the prior art by providing the following.

The present improvement further provides a safety feature of controlling and preventing damage to the wind electric generation system from excessive alternator output produced by an "overspeeding" condition of the alternator as caused by wind propeller speed surges created at high wind gusts, whether or not such be produced by severe storms or other weather conditions. An alternator or generator frequency or speed (rotation) monitoring circuit/system is provided to continually monitor the operation of a wind-driven alternator; and, upon sensing the initial occurrence of an "overspeeding" condition thereof which occurs whenever the frequency or speed of operation of an alternator exceeds a preset value or R.P.M. level, an included circuit means of the invention initiates and effects an instant reduction of alternator energy output to a low level by reducing the alternator excitation field current level to a respective preset or predetermined low rate level for a time commensurate with the time period of the detected "overspeeding" condition. When the overspeeding condition of the alternator has ceased, a normal high rate excitation field current is then supplied to the alternator field winding to thereby produce full alternator output.

This overspeed alternator frequency or speed control feature of the present invention is also necessary to assist the operation of a propeller variable pitch governor control, which normally is included in the wind electric plant of the invention, to feather more quickly because it can speed up faster in a wind gust condition when the alternator drag is reduced. This quicker feathering action allows faster propeller pitch change which quickly reduces wind pressure against propellers, plant and tower of a wind electric plant before further increases in wind velocity can occur; this being realized by the fact that most speed governing devices for wind systems require an increase in speed in order to fully accomplish their operative effect. Therefore, this feature and advantage of the invention assures a fast positive generator/alternator output control during "overspeed" conditions, and by utilizing such control the torque and wind pressure on the entire wind system is immediately reduced which permits a more effective and rapid governor control, thereby preventing strain and damage to propellers and plant and tower, while also preventing the production of excessive alternator output.

Another advantageous and distinct feature of the present improvement is the provision of means for supplying power to a fixed auxiliary load for a controlled, programmable period of time. Within the improved wind electric generation system of the invention, manually programmable switch means are provided for all loads of the system for the purpose of allowing the delivery of the entire alternator output to a selected load for a determined or determinable amount of time. This is desirable when an auxiliary load such as a water pumping device or a hydrogen generation device, or any other type of load that should not be subject to an interruption of its operation, except as predetermined, is connected to a load supply circuit of the present system.

Furthermore, the manually controlled, programmable switch means provided for and with each load supply circuit of the present invention allows one to manually program and/or selectively control the application or supply of alternator output power to a selected load or loads of a wind electric system for a desired or necessary amount of time; which advantage greatly enhances the proficient use of the energy produced by a wind electric installation, while at the same time, substantially increasing the effective operation thereof.

Still further, the present invention provides a substantial improvement over each of the above-referenced U.S. patents, and, particularly, that of U.S. Pat. No. 4,228,361, by providing digital logic field control and load control circuitry which respectively control in a more precise and efficient manner the field circuit operations of a wind-driven alternator or generator, as set forth above, and the automatic and selective switching or diversion of A.C. power from the alternator output to and from various output loads such as a storage battery means, a hot water heater load, a device to manufacture hydrogen gas, a water pumping device, or other desired loads, thereby maintaining a constant load on the wind electric plant to insure the quiet operation of the same, and thus allowing a most proficient operation of such plant to be accomplished.

Even further, and with respect to the above, the hereinafter disclosed improved field current control and load control circuits of the invention, in cooperation with other related circuits and components of the invention, combine to provide means for monitoring, indicating and controlling the complete operation of a wind electric generation system; and, in particular, the load control circuitry includes digital logic electronic components, having related logic circuit/system operations, which provide an additional advantage and object of the invention of precisely monitoring or controlling the load status, load select and load change operations of a wind electric generation plant, such being accomplished with the utmost precision and a high degree of accuracy and speed of operation, as is characteristic of such type(s) of electronic components.

Other objects, advantages, features and a fuller understanding of the instant invention will be had by reference to the following description and claims taken in conjunction with the accompanying drawings in which:

FIG. 1 shows a block diagram of a preferred system embodiment of the instant invention;

FIG. 2, consisting of FIGS. 2a and 2b, shows a combined schematic and block diagram which depicts in schematic form much of that shown in FIG. 1, and which discloses a wind generation system embodying the teachings of the present invention;

FIG. 6 depicts a schematic diagram of the circuitry and components of field logic circuit block A2 shown in FIGS. 1 and 2;

Figure 8:
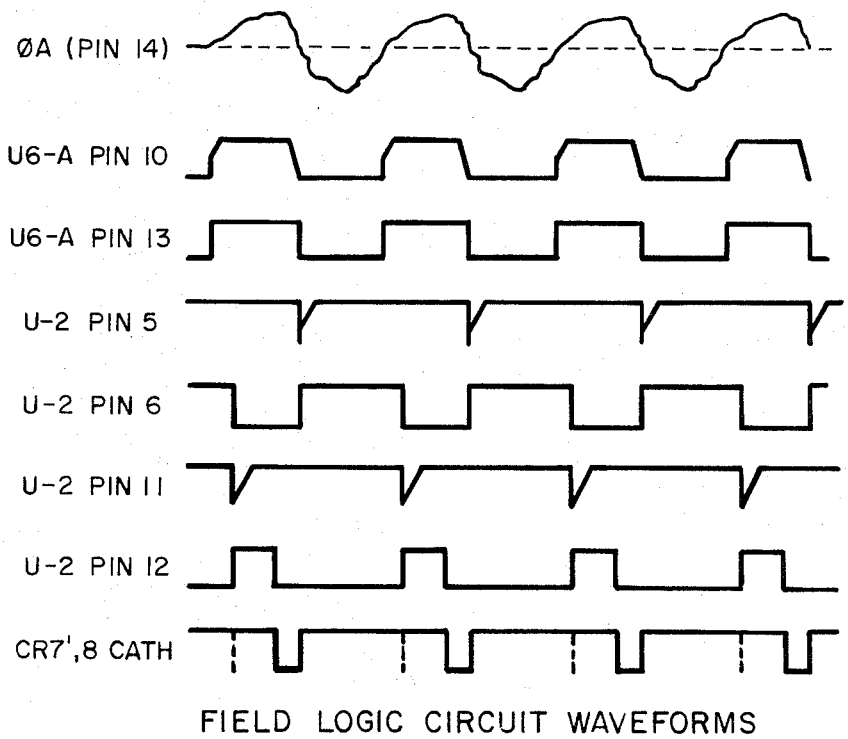
Figure 9:
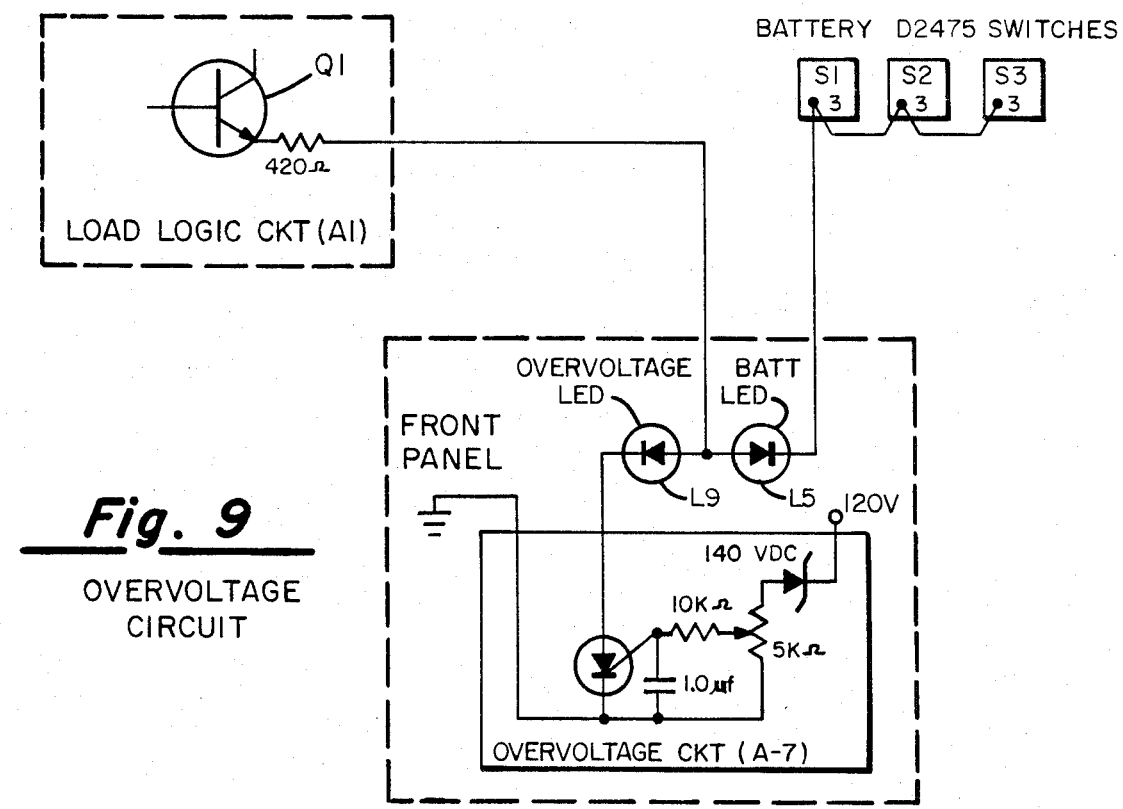

FIG. 7, consisting of FIGS. 7A and 7B, provides operational tables A and B for the purpose of presenting information or disclosure of the major functional control features and operations of the present invention, in order to afford a more expeditious understanding of the invention operations;

FIG. 8 depicts and identifies the signal waveforms of field logic circuit means A2; and, FIG. 9 illustrates an overvoltage circuit of the invention which operates to monitor and control the occurrence of a wind plant storage battery charging (runaway) condition which occurs as a result of a defective component in the storage battery charging circuit.

DETAILED DESCRIPTION OF THE INVENTION

Since the accompanying drawings clearly depict and illustrate the hereinabove referenced invention, along with providing disclosure of the major functional control features and operations thereof, as shown in FIG. 7, only a brief, but sufficient, explanation of the content of the drawing figures will now be presented, same being followed by a detailed description of the various operations of the instant wind electric generation system having improved alternator field excitation and load switching operations.

The inventive system described herewith is designed to control the output of a 3-phase wind-driven alternator, i.e., of up to 12 kilowatts capacity, providing rectified D.C. for battery charging and 3-phase A.C. for external connected auxiliary loads, such as those referenced above. Circuits designed to be protective in their function are included for the detection of multiple load selection, accidental application of reversed battery voltage, wind plant overspeed, and excessive battery voltage. Front panel switches SW1, SW2, and SW3, of A6, are included for independent manual disabling of a battery charging operation and/or the supply of A.C. power to any connected auxiliary loads. When enabled, the full output of the wind plant electric generation system is applied to the batteries until a battery full condition is reached and sensed, whereupon the wind plant energy output is then momentarily reduced, and the alternator output is switched to supply, i.e., an auxiliary load #1. If, and when, a thermostat or demand sensor of such supplied load means opens, or operates, to indicate that the demand has been satisifed, the 3-phase output of the alternator is switched to supply another auxiliary load #2, which is optional within the system of the invention. If such second load means capability is not installed, or the demand sensor of such second load means is open, or operates, to indicate that the demand has been satisfied, the wind plant alternator 3-phase output is automatically reduced to a low rate level and switched to supply to the storage battery means a 0 to 20 amp. trickle-charge. In any event, the full output of the wind plant can be switched back to supply the storage batteries when a battery low condition occurs and is respectively sensed, or an auxiliary load demand sensor again closes. There is shown in FIG. 1 a functional block diagram of the general function of the battery charging/load control system of the invention.

There is included in front control panel assembly A6 of FIG. 1, front panel indicator means which include a battery volt meter M3 (0–150 volts D.C.), a battery charging Ammeter M2 (0–100 amps D.C.), and a wind plant prop./alternator speed meter M1 (0–250 Propeller RPM). Further included in front control panel A6 are nine LED indicator lamps which are provided to display the following functions and identified hereinbelow:

L1—Alt. Rotation
L2—Alt. Min. Speed
L3—Alt. Max. Speed
L4—Alt. Field Energization Status
L5—Battery Charging Status
L6—Load #1 Supply Status
L7—Load #2 Supply Status
L8—Low Rate Operation Status
L9—Overvoltage Battery Charging These LED's are depicted at the top of FIG. 2b and L9 is shown in FIG. 9.

Figure 2A:
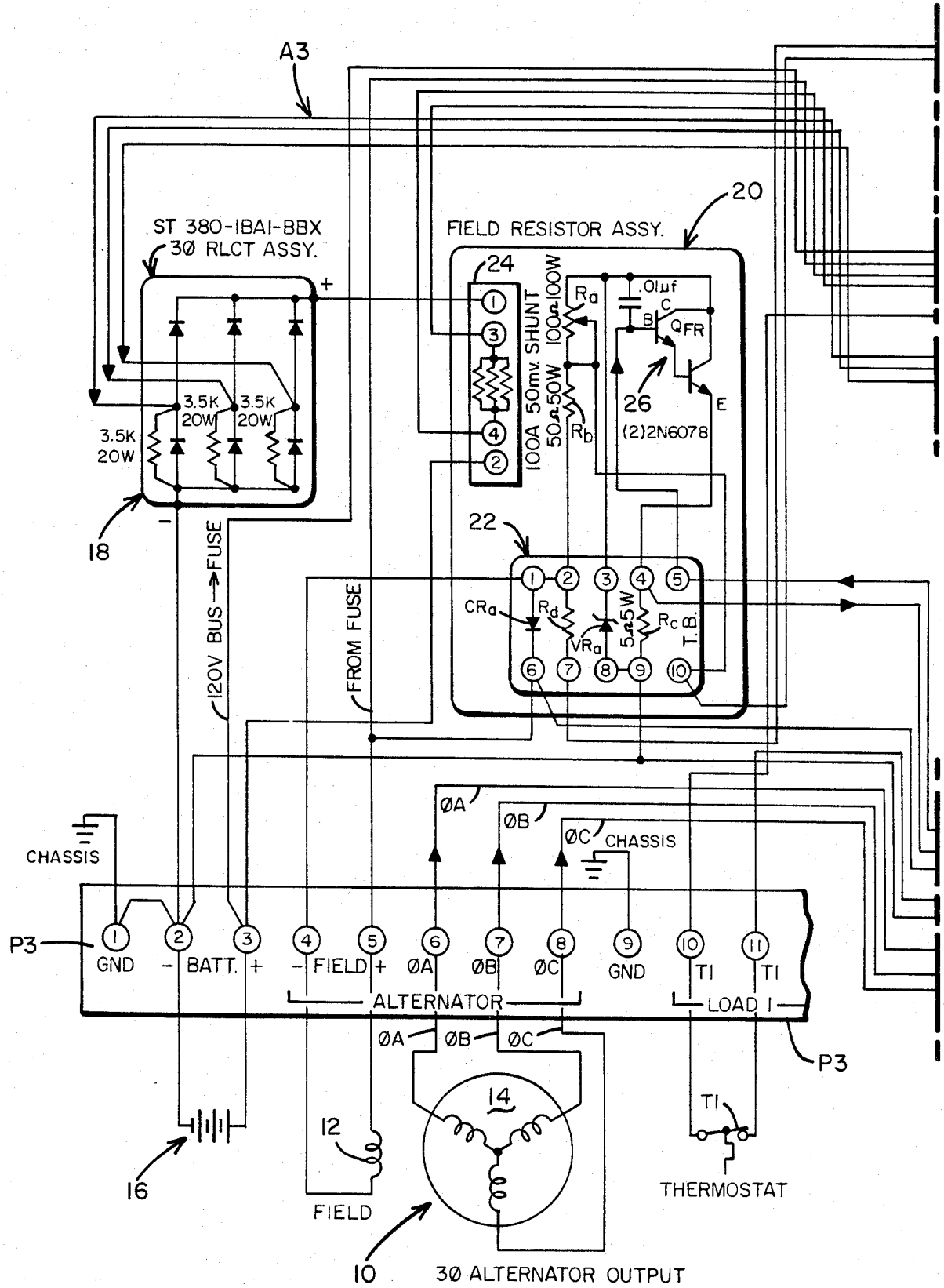
Figure 2B:
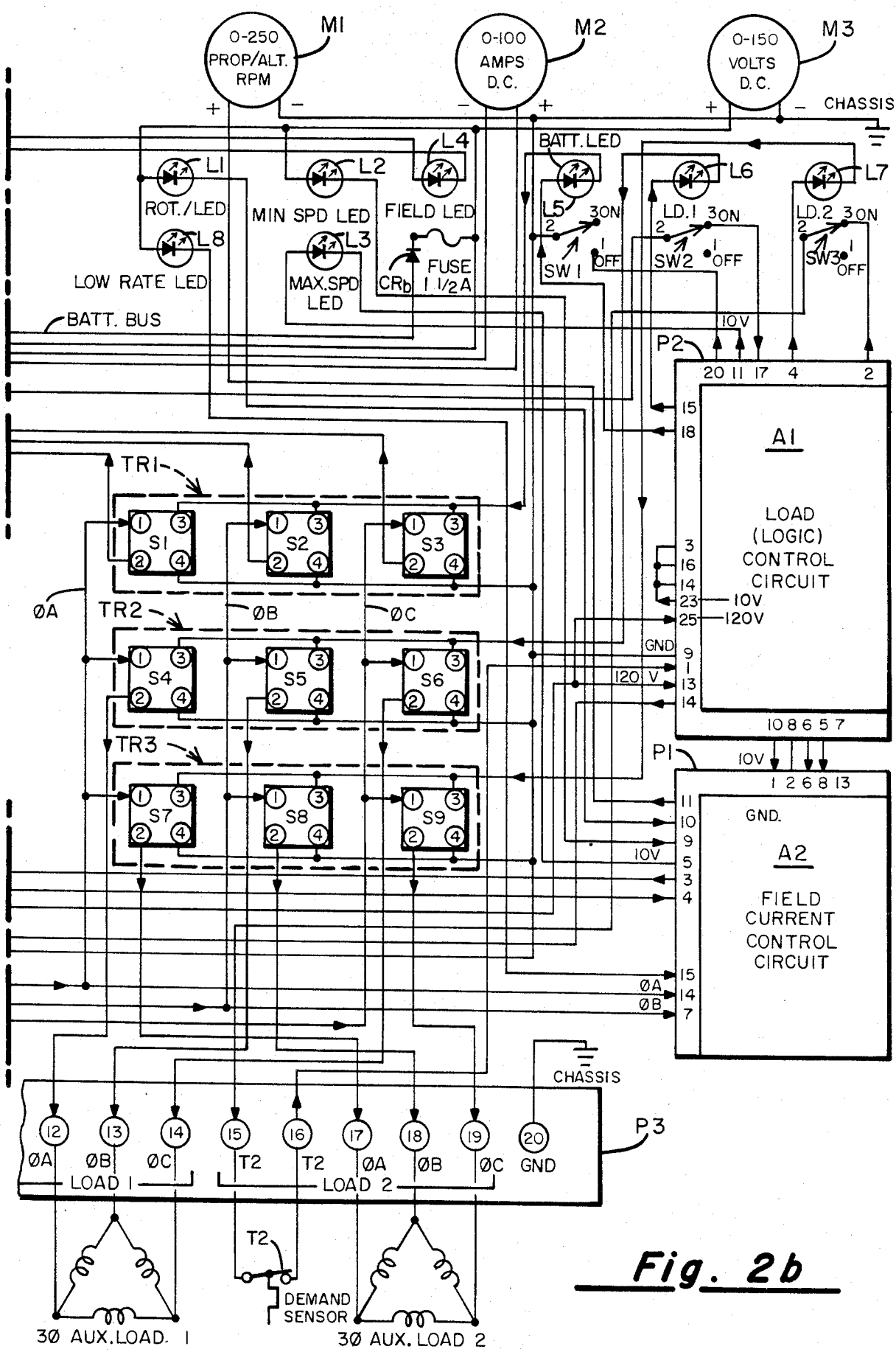

FIG. 1 shows the six (6) functional modules or assemblies which are as follows:

A1—Load Logic
A2—Field Logic
A3—Field Control Assembly
A4—3-Phase Rectifier Assembly
A5—Load Switching Unit
A6—Front Panel Assembly FIGS. 2a and 2b, as stated above, show a combined schematic and block diagram of a wind electric generation plant or system embodying the teachings of the present invention. Depicted and found therein are: load control circuit A1; field current control circuit A2; a wind-driven alternator or generator 10 having field winding 12 and a 3-phase output 14; a storage battery means 16; an auxiliary load 1 having an associated thermostat T1, which load may comprise a hot water heater load; second auxiliary load 2 having an associated supply demand sensor T2, which load may comprise a water pumping device or a hydrogen gas generation unit or any other type of load that should not be subject to an interruption of its operation except as predetermined; and connectors P1, P2 and P3 which operatively connect, as shown, the aforementioned circuits and components to and with load switching SCR set TR1, which controls the supply or transfer of alternator A.C. output power to a 3-phase rectifier assembly 18 (A4) having six power diodes connected as a full-wave 3-phase bridge and 3.5 Kohm, 20 watt resistors to provide the required minimum load for TR1 and which converts the A.C. to D.C. for supply to storage battery 16 for the purpose of charging the same, TR2, which controls the transfer and supply of A.C. alternator output to auxiliary load 1, and TR3, which controls the transfer and supply of the A.C. alternator output to a second auxiliary load 2; each SCR set having three SCR devices therein, which are S1–S3, S4–S6 and S7–S9. The connectors P1, P2, P3 and the depicted circuit lines of FIGS. 2a and 2b also operatively connect: field resistor assembly means 20; meters M1, which measures and indicates wind propeller/alternator R.P.M., and M2 and M3 used for measuring and indicating respectively the current and voltage levels of a storage battery charging operation; light emitting diode (LED) indicators L1 through and including L8 which indicate the occurrence of: wind-driven propeller/alternator rotation (L1), minimum (L2) and maximum (L3) operational rotation speeds of a wind propeller/alternator, alternator field excitation (L4), storage battery charging operation (L5), auxiliary load 1 operation (L6), auxiliary load 2 operation (L7), and low rate excitation field current operation (L8), which indicators are controllably energized and lighted to indicate the event of such disclosed conditions and, accordingly, extinguished or de-energized to indicate the absence of such conditions; and, manually programmable switch means SW1, SW2 and SW3 which, as discussed previously, provide a capable feature and advantage of the invention of supplying power of a wind electric system to a load connected thereto for a controlled and selectively programmable period of time.

Inadvertent damage to the control circuits, and/or their associated components, due to accidental application of reversed polarity battery voltage is prevented by the incorporation of diode $CR_b$ in series with the 1½ amp fuse located on front control panel A6.

The source of current for driving the LEDs L1, L2, and L8 is supplied from the positive side of a storage battery via the depicted respective circuit line and fuse to the anode of each, with the cathode of each of these LEDs being connected, as shown, to the appropriate indicator control points of the system circuitry which are pins 10, 9, and 15 of A2, respectively. L3 has its anode connected to pin 11 of A1, the cathode of which is connected to pin 5 of A2; and, L4 has its anode and cathode respectively connected to pins 7 and 10 of the field resistor board 22 of field resistor assembly 20. L5, L6 and L7 have their individual anodes connected respectively to pins 18, 15 and 4 of A1, the associated cathodes of each of the same being connected to ENABLE pins 3 of load supply switching TRIACs S1 to S3, S4 to S6, S7 to S9, as shown.

The $\phi A$, $\phi B$ and $\phi C$ outputs of the alternator are, as depicted, connected to respective INPUT pins 1 of (S1, S4, S7), (S2, S5, S8) and (S3, S6, S9); pin 2 of each of these SCR devices being connected to the respective beforementioned loads; and, pin 4 of each is grounded. Accordingly, the 3-phase outputs of the wind-driven alternator are selectively supplied in the following manner: S1, S2, S3 via output pins 2 thereof to storage battery 16 via rectifier means 18; S4, S5, S6 via output pins 2 thereof to auxiliary load 1; and, S7, S8, S9 via output pins 2 thereof to auxiliary load 2.

Further shown are: the field resistor and control assembly 20 which includes a component 24 designated to be a 100A 50 mv. shunt, field resistor board component 22 and a field current control driven transistor darlington circuit 26, each of which, and the included components of each thereof, is clearly depicted to be operatively connected with the associated circuitry of FIG. 2; M1 is connected between chassis ground and pin 11 (P1) of A2; M2 connected between pins 3 and 4 of component 24; M3 connected between chassis ground and the positive side of battery means 16, via an in-line fuse; and manually actuated switch means SW1, SW2 and SW3, each having a movable switch member which operates, upon actuation, to connect contact 2 to either contact 3 ("ON" position) or contact 1 ("OFF" position).

In the "ON" position: SW 2 connects T1 between pins 14 and 17 of A1, SW3 connects T2 between pins 1 and 2 of A1, and SW1 is shown in an ungrounded position with respect to pins 9 and 20 of A1.

Figure 5:
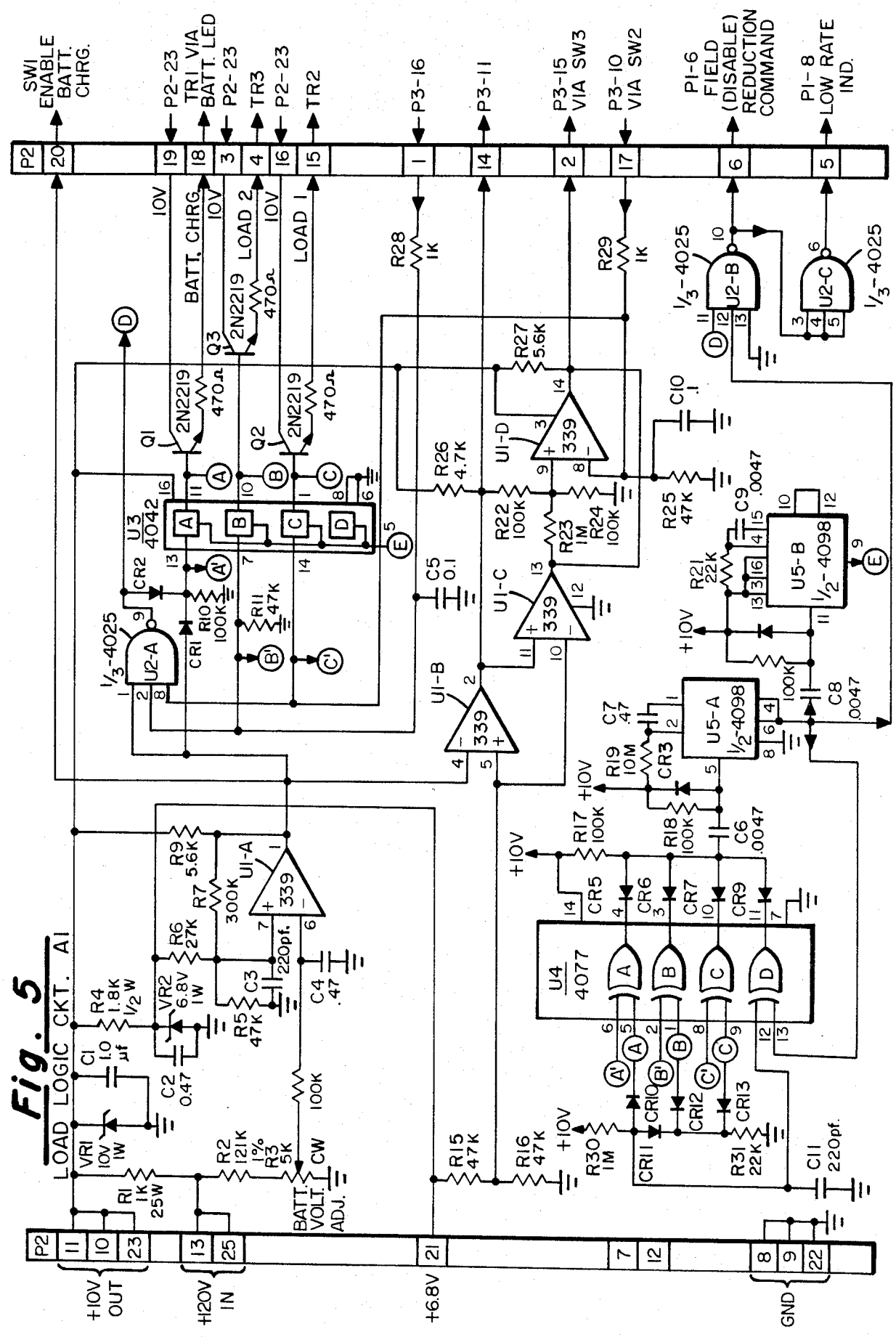
FIG. 5 shows a schematic diagram of the circuitry and components of load logic circuit block A1 shown in FIG. 4.

In the "OFF" position, SW2 and SW3 prevent the energization or supply of power to auxiliary loads 1 and 2, and SW1 allows the grounding of the output of U1-A, of load control circuit A1 shown in detail in FIG. 5, via pins 9 and 20 of A1 and the circuit line connecting the same which includes SW1 in such position.

Thus, SW1, SW2 and SW3 allow the delivery or supply of the entire alternator output to a selected load, or to a selected combination of loads, for a predetermined or desirable amount of time, thereby affording supply of power to selected loads on a priority and/or programmable basis, same being accomplished via a timely and desired manual manipulation of these switch means.

The input and output circuit connections of circuits A1 and A2 are shown in FIGS. 2a and 2b, most of which have been discussed above. Pin 13 of A1 receives a source voltage input, such as 120 V as shown, which is derived from pin 6 of component 22, as does pin 25 of A1, via the depicted circuit lines. A 10 V supply voltage for the respective circuit components of A1 is supplied thereto via pins 3, 16 and 19 from pin 23. A1 and A2 are directly connected to each other via pins 10, 8, 6 and 5 of A1 and pins 1, 2, 6, and 8 of A2. The $\phi A$ and $\phi B$ voltage outputs of the wind-driven alternator are supplied to pins 14 and 7 of A2, respectively, for a purpose to be presented hereinafter; and, with regard to the connections of pins 3 and 4 of A2, these are connected with the field current supply circuit of the invention which will be discussed in detail hereinafter, the following being presented in order to preface such discussion.

In general, the field current supply circuit of the invention, most of which is shown in FIG. 2 while the remaining control circuit therefor exists as part of the internal circuitry of A2 which is depicted in FIG. 6, is as follows: either a high rate (normal operation of wind electric system) or a low rate (overspeed, tricklecharge, or load switching operations of wind electric system) field current will be controllably provided, as the excitation field current for wind-driven alternator 10, from pin 3 of A2 to pin 5 of component 22 to the base of $Q_{FR}$ and from the circuit of $Q_{FR}$ through Ra, Rb and pins 2 and 1 of component 22 to terminal connection 4 of P3, and thence through field winding 12 to provide a controlled excitation for alternator 10; field resistor assembly 20 being connected back to and with field current control circuit A2, at pin 4 thereof, via the depicted circuit lines from the emitter side of $Q_{FR}$ and pin 4 of component 22, and terminal 5 of P3 being connected to the BATT. BUS via the fuse, diode $CR_b$, and the respective depicted circuit lines.

Figure 3:
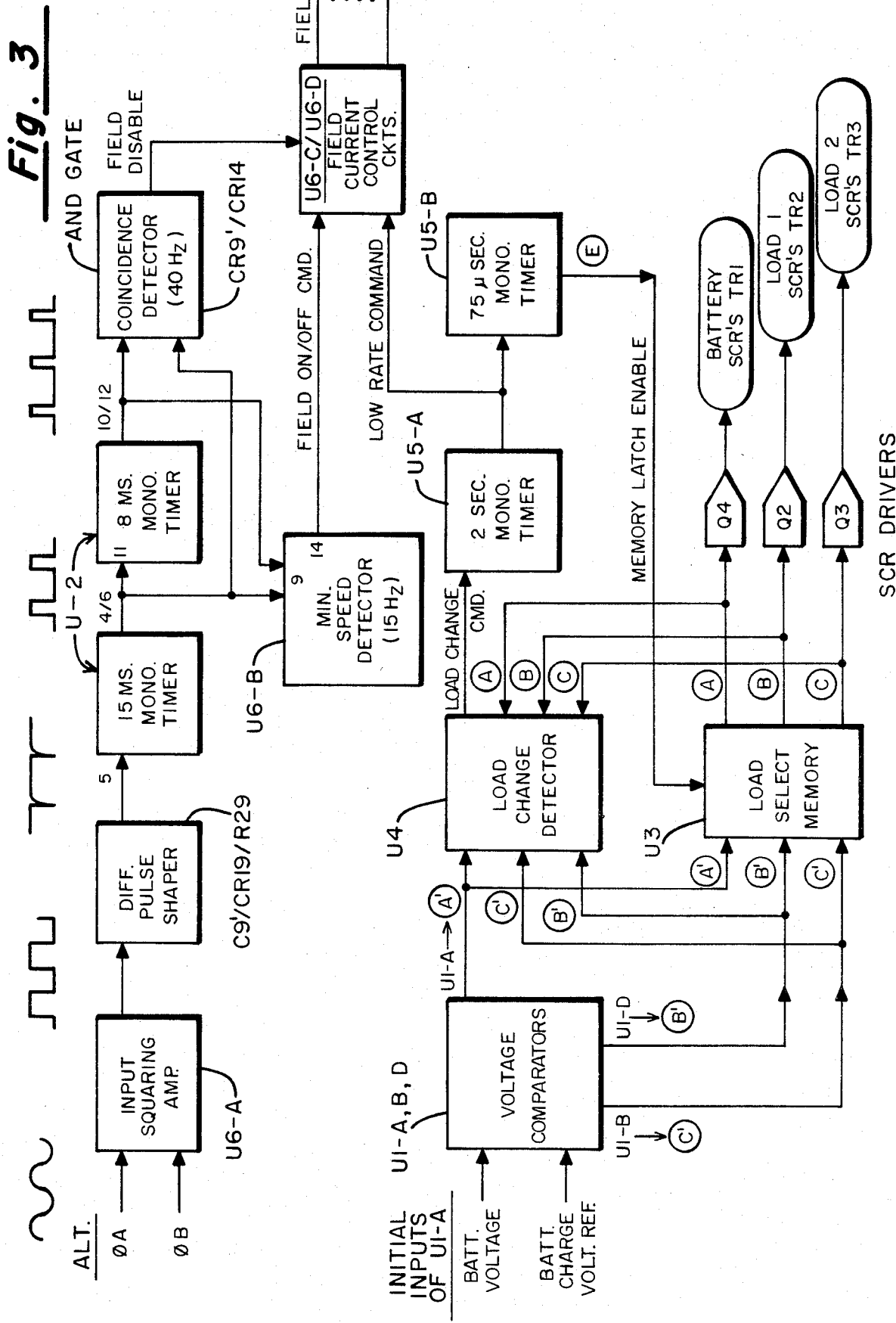
FIG. 3 depicts a signal flow block diagram of the present system and shows most of the major components of the circuit system of the instant invention along with the major logic decision points for the functions thereof, which illustration is provided to more easily understand the operations and advantages of the invention system.
Figure 4:
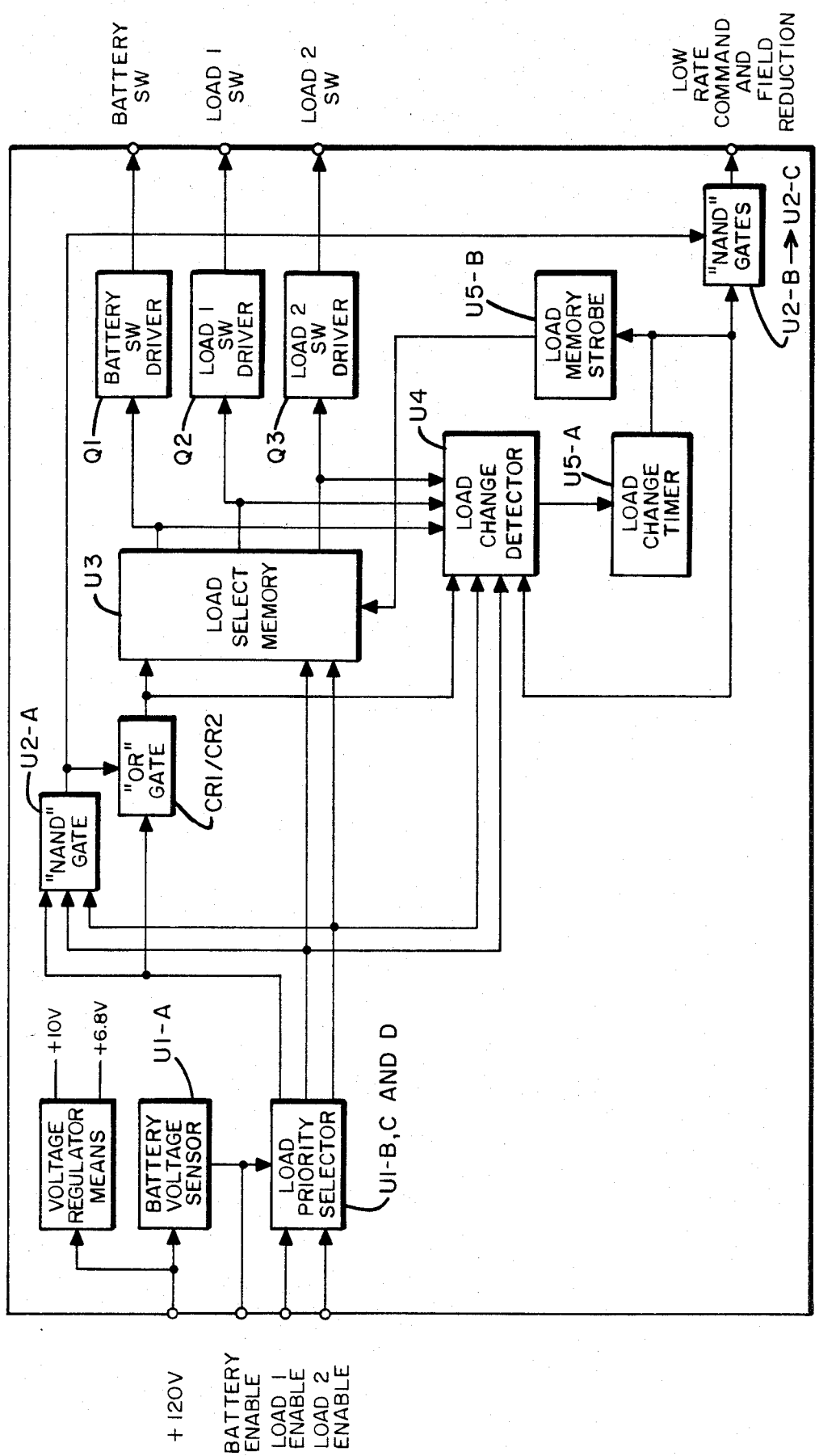
FIG. 4 illustrates a block diagram of the load logic block A1 of FIGS. 1 and 2.

By reference to that shown in FIGS. 3, 4, and 8, the hereinbelow presented discussion of the circuits of FIGS. 5 and 6 and their operation in the overall system of the present invention will be more easily understood.

The circuitry depicted in FIGS. 5 and 6 for the load logic and field logic circuits, respectively, is provided on separate printed circuit (PC) cards.

The primary functions of load logic circuit or module/assembly A1 are low voltage regulation, battery voltage detection, load priority selection, load change detection, and load selection memory having associated therewith the load enable SCR drivers. A functional block diagram of this assembly is shown in FIG. 4, a schematic diagram of such being illustrated in FIG. 5.

In FIG. 5, a source of +10 vdc is provided by the combination of series resistor R1, zener regulator diode VR1, and bypass capacitor C1, which +10 vdc source is used in this circuit and elsewhere in the system of the invention. A second similar circuit, consisting of R4, VR2, and C2, provides a highly stable 6.8 vdc reference voltage for use in this circuit.

The battery low/full charge condition detection function is accomplished by U1-A and its associated passive components. As shown in FIG. 5, U1-A is one section of a CMOS QUAD comparator integrated circuit means, the other sections being designated as U1-B, U1-C, and U1-D. Resistors R5 and R6 form a fixed voltage divider from the 6.8 vdc reference and set the non-inverting input pin 7 of U1-A at about +4.3 volts. The battery voltage is divided down by fixed resistor R2 and adjustable potentiometer R3 to approximately the same (4.3 vdc) voltage level, the battery voltage being supplied thereto via pins 13 and 25 of P2. This sensed voltage, proportional to the battery voltage, is filtered by C4 and applied to the inverting input pin 6 of U1-A.

When the proportional battery voltage at pin 6 of U1-A is below the reference voltage at pin 7 thereof, the output of U1-A, at pin 1 is pulled up (high) to +10 v by resistor R9. When the battery voltage increases such that pin 6 of U1-A exceeds the fixed reference voltage at pin 7, U1-A pin 1 goes low to approximately 0 volts. A desired differential of 16 to 18 volts between a battery low charge level (118 volts) and a full charge level (135 volts) is provided by feedback resistor R7 which causes the reference voltage at pin 7 to increase by about 1 volt when U1-A pin 1 goes high. Capacitor C3 is an RF bypass capacitor utilized to prevent high frequency oscillations of U1-A.

Accordingly, when U1-A operates to provide a high output indicative of a low battery charged condition, this output enables the switching of SCR set TR1, via pin 20 of P2 and the "ON" position of SW1, to cause TR1 to supply the 3-phase output of the alternator to rectifier assembly 18 which, as stated above, provides a D.C. charge operation to storage battery means 16. Conversely, a low output of U1-A indicative of a full charge level of storage battery means 16, causes TR1 to remove the 3-phase alternator output voltage supply from rectifier assembly 18, thereby terminating the battery charging operation.

A load priority selection function is performed by U1-B, U1-C, and U1-D, and one section of a triple 3-input NAND gate means, U2-A.

When enabled by front panel toggle switches SW1, SW2, and SW3, load priority is designed to be: priority #1=battery, priority #2=auxiliary Load 1, and priority #3=auxiliary Load 2; which is accomplished as follows. Output pin 1 of U1-A is connected to pin 13 of load selection memory means U3 and unless this output is grounded by the "OFF" position of battery enable switch SW1, it will cause pin 13 of U3 to go high, thereby switching the wind/alternator output supply to the rectifier 18 whenever a low battery charge voltage condition is sensed, as stated above, by U1-A. Only one 3-phase load may be enabled at any given time. Accordingly, when a storage battery charging operation is enabled, the supply of alternator output to auxiliary loads 1 and 2 are disabled by the operations of U1-B and U1-C and their associated circuit elements. The source for enabling Load 1 is obtained from output pin 2 of U1-B. U1-B is connected as an inverter such that when U1-A pin 1 is high, U1-B pin 2 will be low. U1-C is connected as a non-inverting amplifier (U1-C pin 11 connected to U1-B pin 2) so that when U1-B pin 2 is low, U1-C pin 13 (the source for enabling Load 2) is also low. Thus, neither auxiliary load can be supplied when a battery charging operation is being conducted. Also, when U1-A pin 1 goes low (battery is fully charged or has been disabled), output pin 2 of U1-B goes high to cause Load 1 to be enabled via P2-14 to P3-11 thru T1 to P3-10 and SW2 to P2-17 which connects such enabling signal to pin 8 of U1-D and pin 14 of U3 (section C) and therefrom to enable Q2 to cause TR2 to supply the 3-phase alternator output to Load 1. Also, when Load 1 is selected and enabled, a signal voltage of approximately +10 volts appears at P2-17, at which time Load 2 must be inhibited, which function is performed by U1-D since, as stated above, the inverting input pin 8 of U1-D is connected to P2-17 and, at this time, output pin 14 of U1-D will be low when Load 1 is selected, enabled and supplied.

U1-C pin 13 and U1-D pin 14 are connected as shown to P2-2, which is connected to P3-15 (T2) via SW3 and further connected from P3-16 to P2-1, through R28 and to pin 7 of load select memory U3 (section B), a high at pin 10 of section B of U3 causing Q3 to conduct and provide an enable command to TR3, which operates to connect the alternator output voltage to A.C. Load 2, dependent upon the position of SW3 and the state of operation of demand sensor T2 of Load 2, a similar dependence being relevant to the respective elements of the Load 1 enable supply circuit.

Resistors R25 and R29, along with capacitor C10, shown to be connected with the circuit of U1-D, provide noise filtering for the Load 1 enable control circuit; and, resistors R11 and R28 and capacitor C5 provide a similar filtering function for the Load 2 enable control circuit.

The outputs of the load priority selection function operation and circuitry therefor terminate and connect to input pins 13, 14 or 7 for the battery charging, Load 1 or Load 2 load selections, respectively. Only one of these three pins is allowed to be high at any given time, as caused by the above-described circuitry and components thereof.

U3 is a CMOS (4042) QUAD latch which provides the load select memory function. A logic high or low voltage at U3 input pins 13, 14, or 7 will be transferred to respective output pins 11, 1, and 10 only when U3 pin 5 goes low, such being controlled by the output of pin 9 of U5-B, which will be discussed hereinafter. Such operation allows an actual load switching function to be delayed until the wind plant output of alternator 10 has been programmed down, or selectively regulated, to be at a low rate field current operation for a designed time period of approximately 2 seconds.

In the event that no load is selected or being supplied (battery is full and Loads 1 and 2 are off), this low rate regulation level of field current is utilized in a trickle-charging operation for battery 16, which is performed at this time. This is provided by the combination of U2-A, U2-B, and diodes CR1 and CR2.

U2-A, U2-B, and U2-C comprise a triple 3-input NAND gate means, the output of which is high only when all three inputs are low. Also, as shown in FIG. 5, U2-B is connected to be configured as a 2-input NAND gate since pin 13 thereof is grounded, U2-B functioning to provide a field (disable) reduction command.

The three inputs to U2-A (pins 1, 2, and 8) are connected to the hereinabove described three outputs of the load priority selection function circuitry, and the output of U2-A pin 9 is connected, via diode CR2, to pin 13 of U3 section A. Diodes CR1 and CR2 form a logical OR gate causing pin 13 of U3/A to go high when either U1-A pin 1 is high (battery load is selected) or when a respective output of U2-A pin 9 is supplied to pin 11 of U2-B, causing U2-B to accordingly operate to provide the appropriate signal at pin 10 thereof which causes a low field reduction command signal to be outputted at P1-6, such occurring, in this case, in the trickle-charge condition.

With respect to the above-referenced enable driver means Q1, Q2, and Q3, these are separately connected as emitter followers and function to provide the current gain necessary to drive their respectively connected SCR means TR1, TR2, and TR3, which, as stated above, cause the A.C. output supply of the alternator to be switched and connected during a battery charge, Load 1 or Load 2 supply function.

A load change detection circuit means is provided at U4 and its associated circuitry, such component being a quad Exclusive-OR gate means; the associated circuitry of U4 shown to be a four-input diode AND gate means made up of CR5, CR6, CR7, CR9, and resistor R17.

The Exclusive-OR function of U4 provides a logic high at its output pin (which connects to pin 5 of U5-A via C6) any time the logic (voltage) level of any pair of U4's input pins(6 and 5, 2 and 1, or 8 and 9), is the same (either high or low); and, a logic low signal output of U4 is provided when any of the beforementioned pair of inputs are different, i.e. one being low and one being high.

The logic decision signal inputs and outputs are clearly depicted in FIG. 5 as A', B', C' and A, B, C with respect to the circuits of U3 and U4. Such is also illustrated in FIG. 3 for the purpose of expeditiously understanding the logic decision points and connections of the load logic circuit means.

As further shown in FIG. 5, the inputs of U4-A at pins 5 and 6 of U4 which are labelled A and A', are supplied from the input and output pins respectively of U3-A. The inputs of U4-B and U4-C are similarly connected from U3-B (B, B') and U3-C (C, C') at their respective input pins.

U4 pins 4, 3, and 10 will, therefore, be at a logic high level when any of the respective inputs of the load select memory means U3 are at the same logic level as their respective outputs, thereby indicating that load switching is not required; however, one or more of the A', B', C' inputs of U3 will change state when a load change is commanded by the outputs of U1-A, U1-B or U1-D. When this occurs, the common anode connection of diodes CR5, 6, 7, and 9 will go to a logic low level, whereupon load change timer means U5-A will be triggered or enabled by the presence of this low at pin 5 thereof.

With the occurrence of this operation of U4 and when triggered by such negative-going output pulse of U4 at pin 5 of U5-A, through C6, the output signal at pins 4 and 6 of U5-A will go high for a designed time period of approximately two seconds, which is determined by the values of R19 and C7. This (the) output is connected, as shown in FIG. 5, to three places: U2-B pin 12, U5-B pin 11 via differentiating capacitor C8, and to U4 pin 13 of section D (U4-D). The connection to U2-B pin 12 of the high output of U5-A for this time period causes the field reduction command signal to be outputed by U2-B at P2-6, which connects this signal to P1-6 of the field (logic) control circuit A2, the operation of which will be discussed in detail hereinafter.

Accordingly, for a designed and predetermined time period of two seconds, the 3-phase A.C. output of the wind plant alternator will be reduced from a high rate level to a determined low-rate level when any load switching operation of the present system is being performed.

Such negative going (low) output pulse of U4, which is coupled to U5-B pin 11, a load selection memory strobe means, causes the generation of a short (i.e., 75 microsecond) negative going (low) pulse from output pin 9 of U5-B, which signal is connected to the memory latch enable input pin 5 of load selection memory means U3; this 75 microsecond pulse causing U3 to transfer any of its load command signal inputs to the respective outputs of U3 at the end of the beforementioned two second delay time period.

The remaining section D of U4 in conjunction with respective diode AND and OR gates CR10-11 and CR12-13 provide a protective function in the event that more than one load command signal is ever latched into load memory means U3, which possible occurrence is detected at the inputs of U4.

The anodes of OR gate means CR12 and CR13 are connected with the Load 1 and Load 2 command outputs from U3 pins 1 and 10, and their cathodes are connected together to the top of R31. R31 and, therefore, the cathode of CR11 will be high when either Load 1 or Load 2 is selected. The anodes of CR11 and CR10 are connected together and with "pull-up" resistor R30. The cathode of CR10 is connected to the battery load command output signal of U3 from pin 11. The anodes of CR10 and 11 will be pulled high by R30 only if the battery (cathode of CR10) and either Load 1 or Load 2 (cathode of CR11) are high simultaneously. This decision point is connected to the remaining input pin 12 of U4-D. In an operation of this circuit, when pin 13 of U4-D goes low, at the end of the two second delay time period, pin 12 will also be low and U4-D pin 11 will, therefore, be high. If U4 pin 12 should ever be high (dual loads commanded and selected) when U4 pin 13 goes low, U5-A will be retriggered through CR9 and C6, and the load switching logic decision command function will be repeated.

As further shown in FIG. 5, the field reduction command output signal of U2-B at pin 10 thereof is provided as an input to the inputs of U2-C, at which time an appropriate output is outputed through P2-5 to P1-8 to cause the conduction of Q6 of A2, whereby the low rate LED L8 is lit during the time period of a low rate field current energization operation.

The hereinabove discussed operations of FIG. 5 in cooperation with that of the field logic circuit A2 depicted in FIG. 6 will be clearly understood with the consideration of the following discussion concerning the operation of the circuitry of FIG. 6.

Prior to describing such operation of FIG. 6, the following circuit components of the field control circuit depicted in FIG. 2 will now be presented.

In field control assembly A3, there is contained a Darlington connected field current control driver means $Q_{FR}$, field current control limiting resistors $R_A$ and $R_B$, and a 100 amp. 50 millivolt meter shunt 24 for the storage battery current Ammeter means M2, and a terminal board 22 containing two diodes and two resistors. Diode $CR_a$ is the exciter field shunt diode (2.5A, 1Kv) which prevents building up of reverse voltage due to the inductance of the field; and diode $VR_a$ is a zener diode which operates to limit the voltage across transistor means $Q_{FR}$ from exceeding, i.e., 160 volts, possibly caused by stray or magnetic fields. Resistor $R_d$ (3.9K, 2W) provides series current limiting for the Field indicator LED L4 of the control panel, L4 being connected between terminals 7 and 10 of component 22. Resistor $R_c$ is a 5 ohm, 5 watt component which is connected in series with the exciter field current return circuit and the voltage developed across this resistor, which voltage is proportional to actual field current, is used to regulate the wind plant field, which will be discussed further hereinafter. Also, the regulation of the field current is maintained through feedback via resistor $R_c$ and P1-4 of the field logic circuit A2 and the R3' input to the inverting input pin 4 of U6-D of A2.

The primary functions of field logic control circuit means A2 are wind plant alternator rotation detection and signal conditioning, alternator minimum speed (threshold) detection, alternator overspeed (threshold) detection, field current control regulation, and the enabling of the respective LED indicator means therefor. The field logic circuit is shown in schematic form in FIG. 6 and selected waveforms thereof are depicted in FIG. 7.

As shown in FIG. 6, the +10 volts D.C. for operation of the field logic circuit is obtained at P1-1 from P2-10 of A1. The phase A and phase B A.C. outputs of the wind plant alternator are supplied to P1 - pins 14 and 7, which may be a distorted sine wave signal(s) with an amplitude of approximately 5 volts RMS before field excitation is applied or initiated, and a maximum of 180 volts RMS after the field is energized. Such input is converted to a 10 volt squarewave (one for each cycle per revolution of the alternator) by components associated with U6-A, one section of a CMOS quad comparator means, the remaining sections being utilized for U6-B, U6-C, and U6-D. Back to back diodes CR18, CR21 and CR16, CR20 limit the input to U6-A to approximately ±0.7 vdc, independent of the alternator output voltage. Capacitors C10', C11', and C20, in conjunction with resistors R34 and R39, provide filtering for any input noise and harmonics. Resistor R32 connected from the output pin 13 of U6-A to the non-inverting input thereof at pin 11 provides a small amount of hysteresis to prevent possible oscillation of U6-A during switching of its output.

The squarewave output of U6-A is differentiated by the combination of C9', CR19 and R29 to provide a single negative trigger pulse to input pin 5 of U2, a dual CMOS time delay multivibrator device, which is used as an alternator overspeed detection means, for each revolution of the wind plant alternator 10. Each input trigger pulse supplied to pin 5 of U2 causes it output pin 6 to go high for a time period of 15 milliseconds (0.015 sec), as determined by the value of R29 and C8. The trailing edge of this 15 millisecond pulse is differentiated by C6, R25' and CR15 and applied to input trigger pin 11 of the second half of dual timer means U2. This produces a second positive going pulse at respective output pin 10 which has a time duration of approximately 8 milliseconds, as determined by C7', R26, and the setting of overspeed calibration resistor means R27; such overspeed resistor R27 being set and adjustable to a predetermined overspeed calibrated limit to which this circuit is to respond. The sequential outputs produced by U2 at pins 6 and 10 are used for several functions of A2 and are described individually in the following paragraphs.

A 15 millisecond pulse from pin 6 of U2 is coupled to the wind propeller/alternator RPM meter M1, which is connected between P1-11 and the ground (see FIG. 2) by resistors R42, R38, and R37, the values of which are selected for a 200 RPM meter indication at a 40 Hz input. Zener diode VR1' insures that the pulse amplitude is constant so that meter accuracy is not affected by other component tolerances, or replacement of the A1 circuit card which contains a 10 volt regulator means. Resistors R37 and R38 are factory selected to calibrate the RPM meter.

The 15 millisecond pulse is also applied to the base of alternator rotation LED driver means Q4 through isolator diode CR10' to thereby cause ROT. LED L1 to blink once for each revolution of alternator 10.

The above-recited output pulses from both sections of U2 (the 15 ms and 8 ms pulses) are connected to one side of R19' by a diode OR gate means formed by CR7' and CR8. The resultant 23 ms pulse at the output of this OR gate means is filtered or averaged by R19' and C3' and applied to the non-inverting input pin 9 of U6-B.

The inverting input pin 8 of U6-B is connected to a fixed voltage divider between +10 volts supply and ground, consisting of R6' and R14'. This sets pin 8 at a voltage level of +1.8 vdc and, therefore, the output at pin 14 of U6-B will be low until the voltage at pin 9 (proportional to wind plant speed) exceeds 1.8 volts. This occurs at a propeller speed of rotation of 65 to 75 RPM's for the values of the components shown in FIG. 6. When the voltage at pin 9 exceeds 1.8 volts, output pin 14 of U6-B goes high and the base of alternator minimum speed LED driver means Q5 is no longer held down through CR11', and Q5 turns on to thus cause the minimum speed LED L2 to be lit and thereby indicate that a minimum speed rotation speed of the alternator has been reached. In a similar manner, diode CR3' is also reverse biased, and no longer holds the base of field current drive transistor Q7 at ground. Thus, field LED L4 will be lit when Q7 conducts since L4 is connected between terminals 7 and 10 of component 22 (see FIG. 2) and the signal output of Q7 is supplied via P13 to terminal 5 of component 22 and the associated components of component 20.

The field current control circuit of the present invention is located both in FIG. 6 and that referenced above with respect to FIG. 2. The portion of the field current control circuit located in A2 includes U6-D, Q7 and their associated circuitry. These form part of a proportional, closed-loop field current regulator means in conjunction with $Q_{FR}$ and its related components of field control assembly 83, shown in FIG. 2. The field current control circuitry is not enabled to thereby produce field current of a regulated level unless a predetermined minimum speed of the alternator has been reached which is detected by U6-B, as described above.

A voltage directly proportional to wind plant field current is developed across resistor $R_C$ of component 22 of FIG. 2. This voltage, at a proportionally constant 5 volts per amp. level, is applied to inverting input pin 4 of U6-D through R3'. Diodes CR1' and CR2' prevent any noise pulses at the input to U6-D from exceeding +10 volts or going below ground. A D.C. voltage proportional to the desired field current, which voltage is filtered by R4' and C2' and C1', is applied to non-inverting input pin 5 of U6-D. The output of U6-D at pin 2 is applied to the base of field current driver transistor means Q7 connected as an emitter follower. The output of Q7 through resistor R1' is applied to the input of field current means $Q_{FR}$ of field resistor assembly 20. Thus, whenever the sensed field current (voltage at U6-D pin 4) is less than the commanded field current value at pin 5 of U6-D, the output at pin 2 of U6-D is driven high towards +10 volts. Conversely, whenever the sensed field current is above the commanded value, this output of U6-D is driven low toward ground. Equilibrium is achieved when the average value of these two voltages is equal; note that U6-D pin 2 is unconditionally held low by diode CR3' until minimum alternator RPM is achieved and, thus, there is no field current energization or supply below the set and predetermined minimum speed level.

The field current command control voltage applied to the top of resistor R4' is the result of the following three related circuit functions.

In the absence of an overspeed condition, to be described hereinafter, or a field disable command signal at P1-6 from P2-6 of A1, diodes CR5' and CR4' are reversed biased and effectively not functioning in this circuit. Such control voltage is, therefore, simply equal to the ratio of fixed resistor R10' and adjustable resistor means R41 which is utilized to set a predetermined high-rate level of field current. High-rate adjustment means R41 thus provides a range of 0 to 1 amp. (0 to 5 volts). This predetermined high-rate level of field current is utilized to produce from the alternator a respectively high rate 3-phase output voltage which is utilized during a normal condition of the wind plant system for the functional operations of battery charging and load supplying.

When a low rate (alternator) field current command signal is received (low at P1-6 from P2-6 of A1) for a load switching or trickle-charging operation of the invention system, the low-rate adjustment resistor means R40 is shunted, through diode CR4', across R41. Resistor means R40 is utilized to set a predetermined level of low rate field current; and, assuming a voltage drop of 0.7 volts across diode CR4', R40 provides a low rate field current range of approximately 0.14 to 0.33 amps.

Conversely, when a high or appropriate logic level voltage is present at P1-6, a high rate field current is provided, the value of which is varied by the adjustment or setting of high-rate adjustment (limit) resistor R41, at a respective current range.

The alternator overspeed detection function of the present invention will now be discussed further in detail than that present hereinabove.

With respect to the above, when an overspeed condition of the alternator or wind plant is detected, diode CR4', connected in the circuit of U6-C, is forward biased to thereby cause the reduction of the field current to a low rate level of approximately the 0.14 amp. value referenced above.

Wind plant (alternator) "overspeed" sensing is accomplished by detecting the coincidence, a simultaneous high signal output condition, of the abovementioned two (2) consecutive output pulses of U2 from pins 6 and 10 thereof. Since this pair of pulses occur for each revolution of the operation of the wind plant alternator 10, the previously described second pulse (8 ms) will always terminate prior to the start of the next 15 ms pulse as long as the period of alternator of alternator revolution is longer than the sum of these two pulses. For the values of 15 and 8 ms, pin 10 of U2 will still be high when pin 6 thereof goes high again if the wind propeller speed is greater than $1/(0.015+0.008)\times 5=217$ RPM, such overspeed detection limit be set and adjustable by resistor means R27, which is connected via R26 and C7 to pins 14 and 15 (second half) of U-2.

U6-C is used in field logic circuit A2 to detect an occurrence of an overspeed condition, the circuit operation of U6-C being similar to that of hereinbefore mentioned minimum speed detector circuit means U6-B, except that a fixed voltage is applied to U6-C's non-inverting input pin 7 thereby causing output pin 1 of U6-C to stay high during normal operation of the wind plant system, while a control input voltage is applied to pin 6 of U6-C through diode CR6'; the anode of CR6' being connected to +10 volts through R20', but can be held low by the operation of either CR9' or CR14, the OR gate means.

Thus, unless both outputs of U2 are high simultaneously, the anode of CR6' is always low and the U6-C output stays high.

In the event of an occurrence of an overspeed condition, U6-C output pin goes low, thereby causing a reduction of the field current level to a low rate operational level, via CR5', and the alternator max. speed LED L3 is lit through R11' and P1-5.

R35, Q6, and R36, connected between pins 8 and 15 of P1 of A2, form a driver circuit for low rate LED L8, such that L8 is lit during the time period of operation of the hereinabove discussed low rate field current operation in order to indicate such state of operation of a wind plant system of the present invention.

Furthermore, with respect to the foregoing description of the system of the instant invention and, in particular, the field reduction operation from a high (normal) rate level to a low rate level occurring during a load switching or trickle-charging operation or the occurrence of an overspeed condition, the presently provided system has been designed to employ an appropriate 3-phase alternator device that has an approximate response time of 1 to 2 seconds for producing, from a low voltage level output in accordance with a respective low rate field energization current level, a predetermined high rate level output. Accordingly, the 2 second time period provided by U5-A of the load logic circuit A1, which time period is essentially the low rate operation time period, allows the loads to be switched within such period of time. An example of a suitable alternator employed in the present system is Fidelity Electric "Mustang" No. 375-21 or Onan No. 20.0 YDW-185/1A.

If such described and identified alternator means is ever changed and replaced by one that has a different response time (due to its field winding characteristics) a field current "ramp up" function may be designed into the circuitry of FIG. 6, this being accomplished by selecting an appropriate value for circuit elements R4' and, in particular, C2', which are connected to the non-inverting input pin 5 of U6-D, the alternator field current supply control means. Accordingly, with this modification, the exciter field control "ramps" the current from a low or 0 level back to a high level, which is important with respect to preventing torque shock without strain or vibration damage to the power structure of the wind electric plant, which is discussed in the SUMMARY and OBJECTS passages of this application.

Another advantage and object of the instant invention pertains to controlling a runaway charging operation, of the storage battery charging circuit, caused by a component of such circuit becoming defective or by some other related occurrence of faulty operation.

In this regard, FIG. 9 depicts an overvoltage circuit means of the invention which operates to monitor and control the occurrence of a wind plant storage battery runaway charging condition. Shown therein are an overvoltage circuit, provided in front panel assembly A6, having connected thereto: BATT. LED L5 (which is lit during a battery charging operation); overvoltage LED L9; Q1 (of A1 load logic circuit) having its emitter circuit connected between such LED's; and, the battery supply SCR switches S1-S2-S3 having their enable pins connected to the cathode of BATT. LED L5. Such overvoltage circuit means is clearly depicted in FIG. 9 to include a 120 V storage battery voltage source, a zener diode which operates at a 140 vdc level, a 5 K ohm pot., a 10 K Ω resistor connecting the pot. to the gate of an SCR, the anode of which connects to overvoltage LED L9, and a capacitor. Briefly stated, upon the occurrence of a battery charging runaway condition, as detected by the depicted zener diode, the SCR operates to light overvoltage LED L9, which action causes the Q1 battery charge enable driver means to turn "OFF", thereby terminating the battery charging operation or function of present invention system.

The specific resistor, capacitor, diode and the like values indicated on the schematic diagram FIGURES of the present application are examples of one operative embodiment only and these values could change depending upon the particular application of the described preferred embodiment.

As this invention may be embodied in several forms without departing from the spirit or essential characteristics thereof, the present embodiment is, therefore, illustrative and not restrictive since the scope of the invention is defined by the appended claims rather than by the description preceeding them, and all changes that fall within the metes and bounds of the claims or that form their functional as well as cojointly cooperative equivalents are, therefore, intended to be embraced by those claims.

We claim:

1. In a wind electric generation plant and like system of the type including a wind driven propeller or the like supported at the top of a tower and connected to drive an alternator supported on the tower to generate electrical energy, storage battery means connected to be charged by the alternator, electrical control circuit means supplying current from the storage battery means to the field winding of the alternator, load means requiring A.C. energy connected with the A.C. output circuit of the alternator, and circuit means connected with said electrical control circuit means and operable to selectively supply alternator A.C. energy to the load means and a charging circuit for the storage battery means, said circuit means including means to automatically divert the supply of alternator A.C. energy to and from said load means and said charging circuit thereby maintaining a constant load on the wind electric plant to thereby insure quiet operation of said wind electric plant even at times of strong wind conditions, the improvement including:
   alternator overspeed detection means for detecting the occurrence of an overspeed condition of said alternator;
   means to reduce the field current of said alternator to a predetermined low rate level;
   and means to provide the said predetermined low rate level of field current to the said alternator during the time period of the detected occurrence of said overspeed condition.

2. The improvement defined in claim 1, wherein the load current reducing means includes means to reduce the field current of said alternator to the predetermined low rate level during a load switching operation of said wind electric generation plant.

3. The improvement defined in claim 1 further including means to control at a gradual rate the increase of said predetermined low rate level, of said field current up to a predetermined high rate level, which produces full alternator output energy after the time period of the detected occurrence of said overspeed condition.

4. In a wind electric generation plant and like system of the type including a wind driven propeller or the like supported at the top of a tower and connected to drive an alternator supported on the tower to generate electrical energy, storage battery means connected to be charged by the alternator, electrical control circuit means connecting the storage battery means with the field winding of the alternator, load means requiring A.C. energy connected with the A.C. output circuit of the alternator, and circuit means connected with said electrical control circuit means and operable to selectively supply alternator A.C. energy to the load means and a charging circuit for the storage battery means, said circuit means including means to automatically divert the supply of alternator A.C. energy to and from said load means and said charging circuit thereby maintaining a constant load on the wind electric plant to thereby insure quiet operation of said wind electric plant even at times of strong wind conditions, the improvement comprising
   means to reduce the field current of said alternator to a predetermined low rate level;
   alternator overspeed detection means for detecting the occurrence of an overspeed condition of said alternator; and
   means to provide the said predetermined low rate level of field current to the said alternator during the time period of the detected occurrence of said overspeed condition.

5. The improvement of claim 4 including means for monitoring, controlling, regulating and indicating substantially the operation of said wind electric generation plant.

6. The improvement defined in claim 4 further including means to control at a gradual rate the increase of said predetermined low rate level of said field current up to a predetermined high rate level which produces full alternator output energy, after the time period of the detected occurrence of said overspeed condition.

7. A wind electric generation plant of the type including a storage battery; an alternator having a field winding and providing electrical power for storage battery charging, and providing electrical power output proportioned to field current level at constant armature speed; and a propeller mounted to drive the alternator and cause electrical power output from the alternator, said propeller having a variable pitch governor control feathering the propeller when propeller speed exceeds a feathering level, wherein the improvement comprises: means operatively connected to the alternator for providing a signal having first and second states respectively indicating propeller speed below and above an overspeed level; current conduction means receiving current from the storage battery for supplying normal and lower current to the alternator field responsive respectively to the first and second propellor speed signal states, whereby alternator field current is reduced whenever propeller speed exceeds the overspeed level.

* * * * *